United States Patent
Surply et al.

(10) Patent No.: US 10,273,015 B2
(45) Date of Patent: Apr. 30, 2019

(54) COMPARTMENTALIZED STRUCTURE FOR THE ACOUSTIC TREATMENT AND THE DE-ICING OF AN AIRCRAFT NACELLE AND AIRCRAFT NACELLE INCORPORATING SAID STRUCTURE

(71) Applicant: Airbus Operations SAS, Toulouse (FR)

(72) Inventors: Thierry Surply, Cornebarrieu (FR); Alain Porte, Colomiers (FR)

(73) Assignee: AIRBUS OPERATIONS SAS, Toulouse (FR)

(*) Notice: Subject to any disclaimer, the term of this patent is extended or adjusted under 35 U.S.C. 154(b) by 455 days.

(21) Appl. No.: 15/280,300

(22) Filed: Sep. 29, 2016

(65) Prior Publication Data
US 2017/0096230 A1    Apr. 6, 2017

(30) Foreign Application Priority Data
Oct. 5, 2015 (FR) .................................. 15 59431

(51) Int. Cl.
| B64D 29/00 | (2006.01) |
| B64D 15/04 | (2006.01) |
| B64D 33/02 | (2006.01) |
| F02C 7/045 | (2006.01) |
| F02C 7/047 | (2006.01) |

(52) U.S. Cl.
CPC .............. *B64D 29/00* (2013.01); *B64D 15/04* (2013.01); *B64D 33/02* (2013.01); *F02C 7/045* (2013.01); *F02C 7/047* (2013.01); *B64D 2033/0206* (2013.01); *B64D 2033/0233* (2013.01); *Y02T 50/672* (2013.01)

(58) Field of Classification Search
CPC  B64D 15/04; B64D 2033/0206; B64D 33/02; B64D 2033/0233; B64D 29/00; F02C 7/045; F02C 7/047; F02K 1/827; F05D 2260/962; Y02T 50/672; Y10T 137/0536
See application file for complete search history.

(56) References Cited

U.S. PATENT DOCUMENTS

| 2,750,737 | A | * | 6/1956 | Leigh | ...................... | F02C 7/047 |
| | | | | | | 200/81 R |
| 3,033,734 | A | * | 5/1962 | Price | ........................ | B32B 3/12 |
| | | | | | | 156/197 |
| 3,913,702 | A | * | 10/1975 | Wirt | ........................ | B64D 33/06 |
| | | | | | | 181/286 |

(Continued)

FOREIGN PATENT DOCUMENTS

| FR | 2925463 | 6/2009 |
| FR | 2953811 | 6/2011 |

OTHER PUBLICATIONS

French Search Report, dated Mar. 15, 2016, priority document.

*Primary Examiner* — Medhat Badawi
(74) *Attorney, Agent, or Firm* — Greer, Burns & Crain, Ltd.

(57) ABSTRACT

An acoustic structure for an aircraft nacelle which comprises an acoustically resistive substructure, at least one layer of cells and a reflective layer. The acoustic structure comprises at least one single-piece substructure which divides up the layer of cells and which incorporates elongated elements of a de-icing system.

12 Claims, 2 Drawing Sheets

(56) References Cited

U.S. PATENT DOCUMENTS

| | | | | |
|---|---|---|---|---|
| 3,933,327 A * | 1/1976 | Cook | | B64D 15/04 244/134 B |
| 3,983,955 A * | 10/1976 | Vasiljevic | | G10K 11/16 181/285 |
| 4,257,998 A * | 3/1981 | Diepenbrock, Jr. | | B29C 33/52 264/156 |
| 4,298,090 A * | 11/1981 | Chapman | | F02C 7/24 181/286 |
| 4,749,150 A * | 6/1988 | Rose | | B64C 21/06 181/214 |
| 4,787,473 A * | 11/1988 | Fuchs | | F16L 55/033 181/224 |
| 5,114,100 A * | 5/1992 | Rudolph | | B64O 21/06 244/130 |
| 5,257,498 A * | 11/1993 | Nikkanen | | B64D 15/04 244/134 B |
| 6,050,523 A * | 4/2000 | Kraenzien | | B64C 9/00 244/123.1 |
| 6,772,857 B2 * | 8/2004 | Porte | | F02C 7/045 181/210 |
| 6,827,180 B2 * | 12/2004 | Wilson | | B32B 3/20 181/292 |
| 7,055,304 B2 * | 6/2006 | Courtot | | F01D 5/146 244/134 B |
| 7,946,385 B2 * | 5/2011 | Lalane | | F02C 7/045 181/290 |
| 8,757,547 B2 * | 6/2014 | Porte | | B64D 33/02 244/134 B |
| 8,783,412 B2 * | 7/2014 | Todorovic | | F02C 7/045 181/213 |
| 9,390,704 B2 * | 7/2016 | Hurlin | | B64D 15/04 |
| 9,592,918 B2 * | 3/2017 | Yu | | B64D 33/06 |
| 9,761,216 B2 * | 9/2017 | Nampy | | G10K 11/172 |
| 9,764,818 B2 * | 9/2017 | Nampy | | B64C 1/40 |
| 9,978,354 B2 * | 5/2018 | Nampy | | F02C 7/24 |
| 2002/0139900 A1 * | 10/2002 | Porte | | B64D 15/04 244/134 C |
| 2004/0094359 A1 * | 5/2004 | Porte | | B64D 33/02 181/214 |
| 2005/0006529 A1 * | 1/2005 | Moe | | B64D 15/12 244/134 D |
| 2005/0269443 A1 * | 12/2005 | Porte | | F01D 21/04 244/53 B |
| 2006/0219475 A1 * | 10/2006 | Olsen | | B64D 33/02 181/214 |
| 2007/0102582 A1 * | 5/2007 | Botura | | B64D 15/14 244/134 D |
| 2007/0130912 A1 * | 6/2007 | Kraft | | F02O 6/08 60/226.1 |
| 2009/0314899 A1 * | 12/2009 | Porte | | B64D 15/04 244/53 B |
| 2010/0096213 A1 * | 4/2010 | Frustie | | B64D 33/02 181/214 |
| 2010/0181420 A1 * | 7/2010 | Porte | | B64D 33/02 244/1 N |
| 2010/0199629 A1 * | 8/2010 | Chene | | B64D 15/12 60/39.093 |
| 2010/0276548 A1 * | 11/2010 | Porte | | B64D 15/04 244/53 B |
| 2011/0139927 A1 | 6/2011 | Porte et al. | | |
| 2012/0090693 A1 * | 4/2012 | Chelin | | B64D 15/04 137/15.1 |
| 2015/0104289 A1 * | 4/2015 | Mackin | | F04D 27/023 415/1 |
| 2017/0096230 A1 * | 4/2017 | Surply | | B64D 15/04 |
| 2017/0210477 A1 * | 7/2017 | Mackin | | B64D 15/06 |
| 2017/0313428 A1 * | 11/2017 | Mackin | | B64D 15/04 |

* cited by examiner

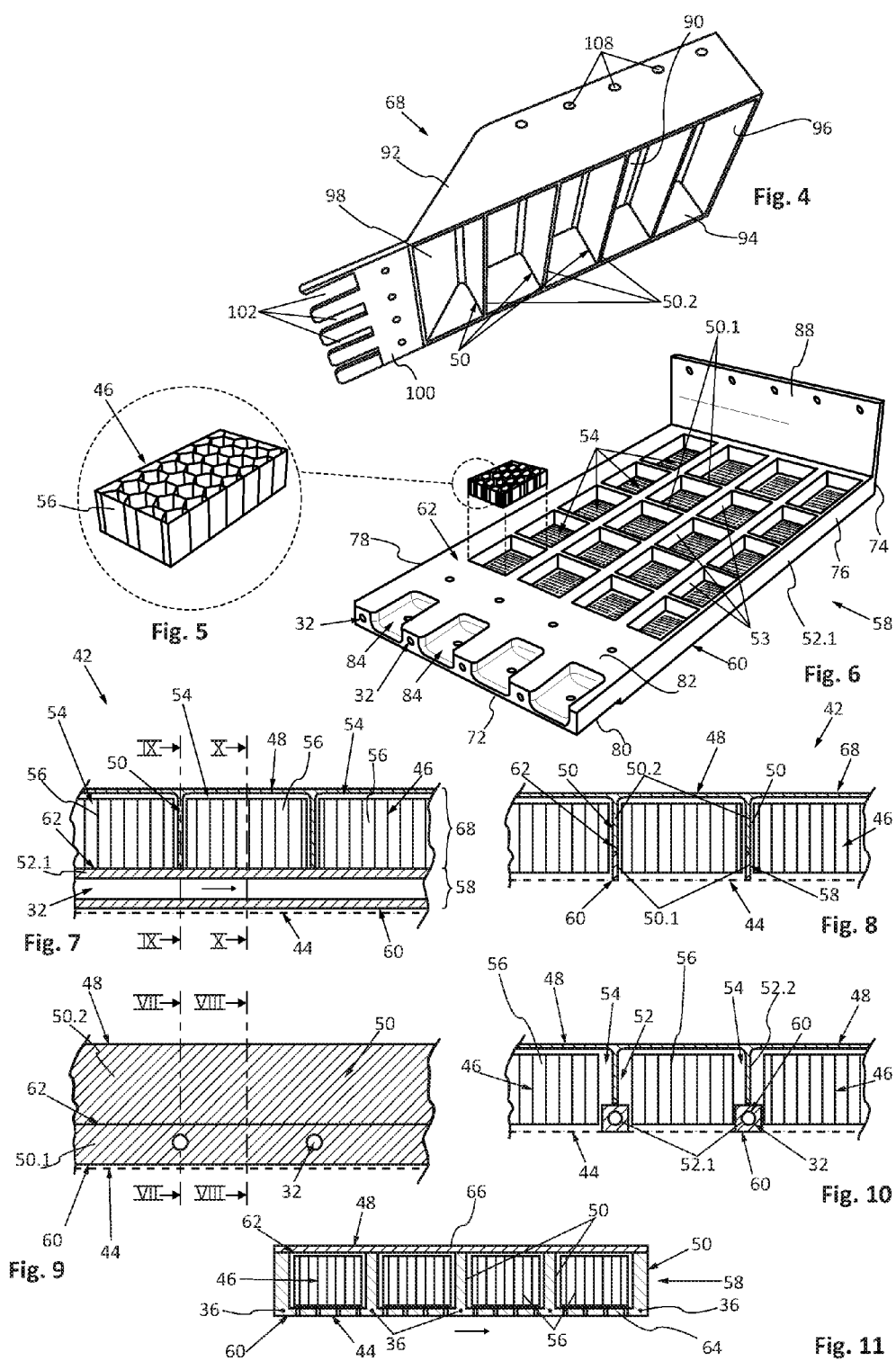

COMPARTMENTALIZED STRUCTURE FOR THE ACOUSTIC TREATMENT AND THE DE-ICING OF AN AIRCRAFT NACELLE AND AIRCRAFT NACELLE INCORPORATING SAID STRUCTURE

CROSS-REFERENCES TO RELATED APPLICATIONS

This application claims the benefit of the French patent application No. 1559431 filed on Oct. 5, 2015, the entire disclosures of which are incorporated herein by way of reference.

BACKGROUND OF THE INVENTION

The present invention relates to a compartmentalized structure for the acoustic treatment and the de-icing of an aircraft nacelle and to a nacelle incorporating said structure.

The document FR-2,925,463 describes a structure for acoustic treatment positioned at an air inlet of an aircraft nacelle.

This structure for acoustic treatment comprises at least one acoustically resistive substructure, strips of cells arranged in a direction substantially at right angles to a direction of flow of the air flow entering into the nacelle and at least one reflective layer.

Given the curved profile of an air inlet of a nacelle, there is a pressure gradient in the direction of flow of the air flow on the surface of the acoustically resistive substructure. Because of this pressure gradient, air flows can penetrate into the acoustic structure at a first point and re-emerge at a second point staggered in the direction of flow relative to the first point. This air recirculation phenomenon disrupts the flow of the air flow which enters into the nacelle which can affect the operation of the engine.

According to this document FR-2,925,463, to remedy this drawback, the structure comprises caissons oriented at right angles to the direction of flow. Each caisson has a U-shaped section, the branches of which are linked to the acoustically resistive substructure, at least one strip of cells being enclosed between each caisson and the acoustically resistive substructure. According to this configuration, the caissons limit the occurrence of air flow inside the strips of cells.

According to one assembly method, the end of each branch of the caissons comprises a flange which is pressed against and welded to the acoustically resistive substructure. According to one embodiment, all the caissons are linked and form a partitioning substructure. This partitioning substructure is assembled with the acoustically resistive substructure then machined to remove the material of the partitioning substructure provided between the channels to clear the acoustically resistive substructure. This embodiment is relatively lengthy and complex, and therefore costly.

According to one embodiment described in this document FR-2,925,463, the acoustically resistive substructure comprises a first layer in contact with the air flow and a second layer inserted between the first layer and the strips of cells, the second layer comprising furrows forming channels in the acoustically resistive substructure when the first and second layers are pressed against one another. According to this embodiment, hot air flows in the channels to ensure the de-icing function.

The embodiments proposed by the document FR-2,925,463 are not fully satisfactory because the seal-tightness depends on the quality of the weld between the caissons and the acoustically resistive layer. According to another drawback, it is possible to obtain a seal-tight barrier only in one direction. Either the caissons are oriented at right angles to the direction of flow and form seal-tight barriers in the direction of flow or the caissons are oriented in the direction of flow and form seal-tight barriers in a direction at right angles to the direction of flow.

SUMMARY OF THE INVENTION

So, the present invention aims to remedy the drawbacks of the prior art.

To this end, a subject of the invention is an acoustic structure for an aircraft nacelle, which comprises, moving away from the axis of the nacelle, an acoustically resistive substructure, at least one layer of cells, a reflective layer, elongated elements of a de-icing system, first partitions arranged in transverse planes.

According to the invention, this acoustic structure comprises a plurality of acoustic caissons juxtaposed with one another on at least a part of the periphery of the nacelle, each acoustic caisson being delimited by tight lateral walls arranged in longitudinal planes, each acoustic caisson comprising at least one single-piece substructure to divide up the layer of cells which comprises:

the first partitions and/or first parts of the first partitions linked to the acoustically resistive layer, linked together by at least a part of the lateral walls of the acoustic caisson, at least a part of the lateral walls of the acoustic caisson, the elongated elements of the de-icing system.

The use of a single-piece substructure to divide up the layer of cells which incorporates the elongated elements of the de-icing system simplifies the design of the acoustic structure. Also, the single-piece substructure takes the form of a single rigid element which is easily assembled with the other elements of the acoustic structure. Furthermore, seal-tight barriers are obtained in two directions.

According to another feature, the single-piece substructure comprises, inserted between the lateral walls of the acoustic caisson, second partitions and/or parts of second partitions linked to the acoustically resistive layer and configured to link the first partitions and/or the first parts of the first partitions.

Preferably, the single-piece substructure comprises at least one layer of the acoustically resistive substructure. This solution makes it possible to optimize the seal-tightness.

According to a first variant, the acoustically resistive substructure comprises a perforated plate or sheet incorporated in the single-piece substructure.

According to another variant, the acoustically resistive substructure comprises a porous layer and a structural layer which comprises wide openings blocked by the porous layer, said structural layer being incorporated in the single-piece substructure.

According to another variant, the single-piece substructure comprises a first continuous surface to which the acoustically resistive substructure is bonded.

Advantageously, the single-piece substructure comprises a first surface oriented towards the axis of the nacelle and a second surface opposite the first surface, said second surface being continuous and forming a joining surface.

According to a first variant, each acoustic caisson comprises a cover linked to the second surface of the single-piece substructure.

According to one embodiment, the cover comprises the reflective layer and the second parts of the first partitions linked to the reflective layer. Preferably, the cover is single-piece.

Another subject of the invention is a nacelle and an aircraft comprising an acoustic structure according to the invention.

BRIEF DESCRIPTION OF THE DRAWINGS

Other features and advantages will emerge from the following description of the invention, a description given purely as an example, in light of the attached drawings in which:

FIG. 4 is a perspective view of a first part of the acoustic caisson visible in FIG. 3, FIG. 5 is a perspective view of a panel of cells configured to be arranged in a compartment of the acoustic caisson visible in FIG. 3, FIG. 6 is a perspective view of a second part of the acoustic caisson visible in FIG. 3, FIG. 7 is a cross section in a first longitudinal plane VII-VII of FIG. 9 of a part of an acoustic caisson which illustrates a second embodiment of the invention, FIG. 8 is a cross section in a second longitudinal plane VIII-VIII of FIG. 9 of a part of the acoustic caisson which illustrates the second embodiment of the invention, FIG. 9 is a cross section in a first transverse plane IX-IX of FIG. 7 of a part of the acoustic caisson which illustrates the second embodiment, FIG. 10 is a cross section in a second transverse plane X-X of FIG. 7 of a part of the acoustic caisson which illustrates the second embodiment, FIG. 11 is a cross section in a longitudinal plane of an acoustic caisson which illustrates a third embodiment of the invention.

DETAILED DESCRIPTION OF THE PREFERRED EMBODIMENTS

Figure 1:
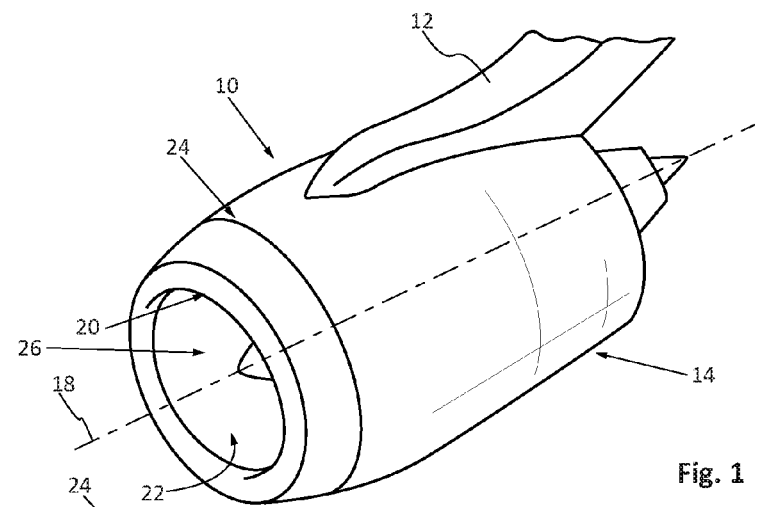
FIG. 1 is a perspective view of an aircraft nacelle.

FIG. 1 shows a propulsive assembly 10 of an aircraft linked to a wing via a strut 12. However, this propulsive assembly could be linked to other zones of the aircraft.

This propulsive assembly comprises an engine drive arranged substantially concentrically in a nacelle 14 which notably makes it possible to channel a flow of air towards the engine drive.

For the rest of the description, the longitudinal direction is parallel to the axis of the nacelle referenced 18. A longitudinal plane is a plane passing through the axis of the nacelle 18. A transverse plane is a plane at right angles to the longitudinal direction. A radial direction is a direction at right angles to the axis of the nacelle 18.

The terms front and rear refer to the direction of flow of the air flow in the nacelle. The front corresponds to a zone where the air flow enters into the nacelle and the rear to a zone where the air flow leaves the nacelle. Furthermore, the term aerodynamic surface corresponds to a surface of the nacelle in contact with the air flow. Finally, the term layer denotes one or more layers bonded to one another which can be more or less thick.

The nacelle 14 comprises, at the front, a lip 20 which is prolonged inside the nacelle 14 by an inner wall 22 and outside the nacelle 14 by an outer wall 24. The inner wall 22 delimits an approximately cylindrical inner duct 26 which channels the air flow towards the engine drive.

The lip 20 and the inner wall 22 form a subassembly of the nacelle called air inlet.

According to one embodiment, the lip 20 comprises a first radius of curvature in a longitudinal plane (visible in FIG. 2) which approximately forms a C and a second radius of curvature in a transverse plane (visible in FIG. 1) that is approximately circular. According to one embodiment, the bottom portion of the lip 20 comprises a flat and the leading edge 28 of the lip which corresponds to the forward-most line of the lip 20 is arranged in a plane which is inclined relative to the longitudinal direction.

The nacelle 14 comprises a front frame 30 which links the inner wall 22 and the outer wall 24 and which forms, with the lip 20, an annular duct 31 which is also called D-duct.

The nacelle 14 comprises a de-icing system whose purpose is to limit the appearance or the build-up of frost or ice on the aerodynamic surface of the air inlet.

Figure 2:
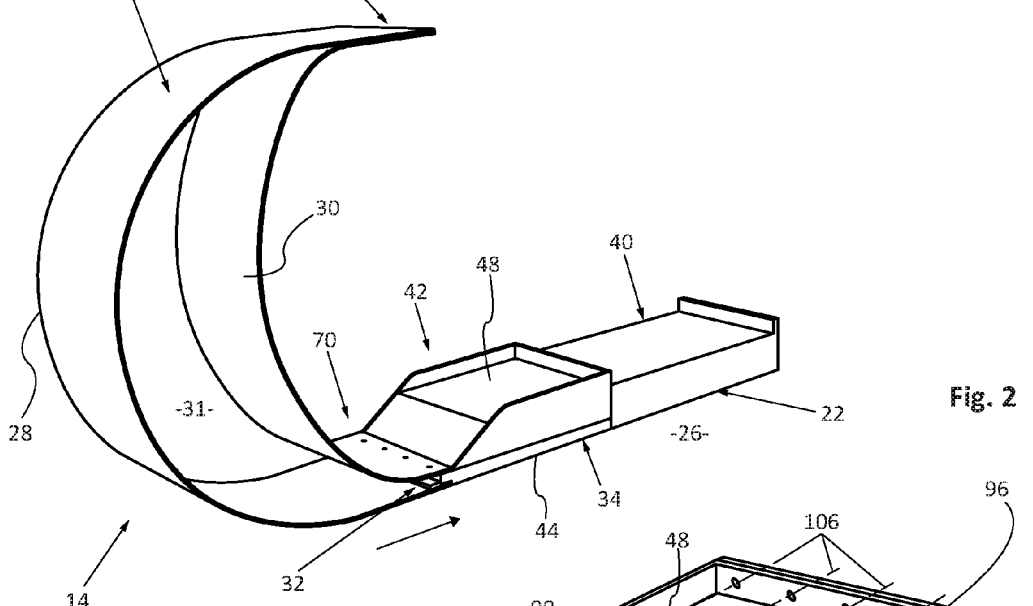
FIG. 2 is a perspective cross-sectional view of an air inlet of an aircraft nacelle which illustrates the invention.
Figure 3:
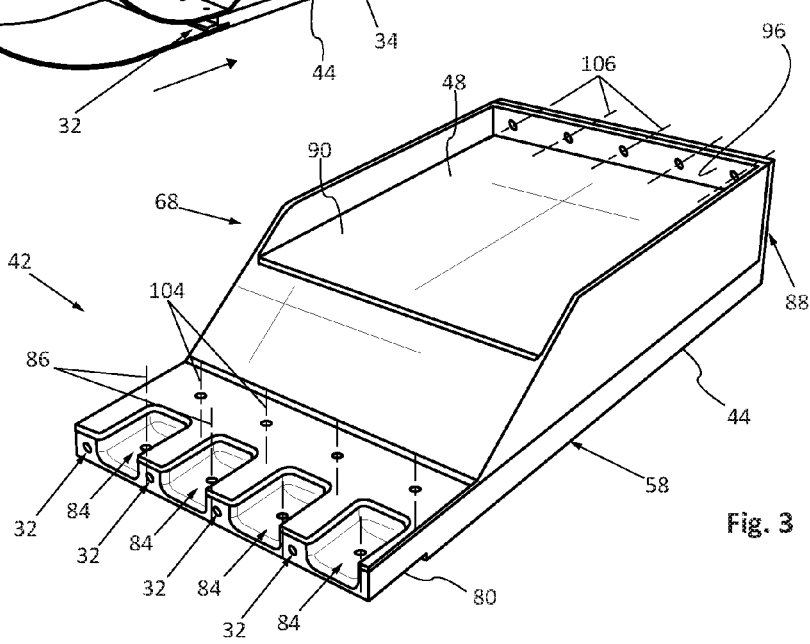
FIG. 3 is a perspective view of an acoustic caisson which illustrates a first embodiment of the invention.

According to a first variant, the de-icing system is of pneumatic type. As illustrated in FIG. 2, the nacelle 14 comprises a hot air supply linked to the annular duct 31. According to this first variant, the de-icing system also comprises ducts 32 positioned close to the aerodynamic surface of the inner wall 22 and configured to channel hot air from the annular duct 31 to outlets 34 emerging in the inner duct 26 and staggered towards the rear relative to the annular duct 31.

According to a second variant, the de-icing system is of electrical type. According to an embodiment illustrated by FIG. 10, the de-icing system comprises electrical resistors 36 positioned close to the aerodynamic surface of the air inlet.

Whatever the variant, the de-icing system comprises elongated elements 32 or 36 positioned close to the aerodynamic surface of the air inlet, said elongated elements being present on at least a part of said aerodynamic surface of the air inlet.

To limit sound nuisance, the nacelle 14 comprises at least one structure for acoustic treatment hereinafter called acoustic structure, the aim of this is to absorb a part of the sound energy, notably by using the principle of Helmholtz resonators.

As illustrated in FIG. 2, an acoustic structure 40 forms a part of the inner wall 22. According to one embodiment, this acoustic structure 40 comprises an acoustically resistive substructure, a layer of cells and a reflective layer. According to another embodiment, the acoustic structure 40 comprises an acoustically resistive substructure, a first layer of cells, an acoustically resistive layer called septum, a second layer of cells and a reflective layer.

Since the acoustic structure 40 is far enough away from the lip, it does not comprise a de-icing system.

With the bypass ratios of the engine drives becoming increasingly higher, the diameter of the nacelles tends to be increasingly greater. Consequently, to limit the impact of this increase in diameter on the weight of the nacelle, the air inlet is increasingly shorter. So, the acoustically treated zone extends over the entire length of the inner duct 26, even to the lip 22.

To this end, the nacelle 14 comprises at least one second acoustic structure which incorporates a de-icing system.

This acoustic structure comprises a plurality of caissons 42 juxtaposed with one another over at least a part of the periphery of the nacelle and which form a first partitioning along the periphery of the nacelle. Each acoustic caisson 42 is delimited by two tight lateral walls which can be produced of a single piece or in a number of parts.

Each caisson 42 comprises, moving away from the axis of the nacelle 18, an acoustically resistive substructure 44 in contact with the air flow in operation, at least one layer of cells 46 and a reflective layer 48.

This acoustic caisson 42 also comprises at least one series of partitions 50 that are parallel to one another and arranged in transverse planes and which form a second partitioning in the longitudinal direction. Thus, according to one embodiment, each caisson comprises a plurality of volumes (five according to FIG. 6) separated from one another by partitions 50 which prevent the circulation of air from one volume to the other in the longitudinal direction.

According to a first variant visible in FIG. 11, the acoustic caisson 42 comprises a single series of first partitions 50 arranged in transverse planes.

According to other variants visible in FIGS. 7 to 10, the caisson 42 comprises a first series of first partitions 50 arranged in transverse planes and a second series of second partitions 52 arranged in longitudinal planes.

As an indication, the first partitions 50 are spaced apart by a distance of between 20 and 60 mm The second partitions 52 are arranged over at least a part of the circumference of the air inlet and are spaced apart by an angle of between 10 and 60°.

The first partitions 50 are linked on the one hand to the acoustically resistive substructure 44 and on the other hand to the reflective layer 48.

According to a first variant visible in FIGS. 4 to 6 and 11, the acoustic caisson 42 comprises only first partitions 50 arranged in transverse planes which are linked on the one hand to the acoustically resistive substructure 44 and on the other hand to the reflective layer 48. In this case, the first partitions 50 extend over the entire height of the acoustic structure 42 and limit the circulation of air in the longitudinal direction in the acoustic structure 42. According to this variant, the acoustic structure 42 does not comprise second partitions 52.

When the de-icing system comprises ducts 32, these ducts 32 are incorporated in half-partitions 53 arranged in longitudinal planes and which are linked to the acoustically resistive substructure 44 and are spaced apart from the reflective layer 48.

According to another variant visible in FIGS. 7 to 10, the first partitions 50 and the second partitions 52 are linked on the one hand to the acoustically resistive substructure 44 and on the other hand to the reflective layer 48. In this case, the first partitions 50 and the second partitions 52 extend over the entire height of the acoustic structure 42 and limit the circulation of air in the longitudinal and transverse directions in the acoustic caisson 42.

According to a first embodiment visible in FIG. 11, a partition 50 or 52 is produced in a single piece.

According to other embodiments visible in FIGS. 3 to 10, a partition 50 (or 52) is produced in two parts, a first part 50.1 (or 52.1) linked to the acoustically resistive substructure 44 and a second part 50.2 (or 52.2) linked to the reflective layer 48. According to these embodiments, for each partition, the first and second parts 50.1 (or 52.1) and 50.2 (or 52.2) are arranged edge-to-edge. Advantageously, a seal is inserted between the first and second parts 50.1 (or 52.1) and 50.2 (or 52.2) of a same partition 50 (or 52).

According to another feature of the invention, the first partitions or the first parts of the first partitions are linked together by the second partitions or the first parts of the second partitions so as to delimit compartments 54, each of which contains at least one panel of cells 56. Each panel of cells 56 comprises a plurality of adjacent ducts which each emerge at a first end towards the acoustically resistive substructure 44 and at a second end towards the reflective layer 48.

According to a first variant, a compartment 54 comprises a single panel of cells trending in the radial direction.

According to another variant, a compartment 54 comprises at least two superposed panels of cells 56 trending in the radial direction, the superposed panels of cells 56 being separated by an acoustically resistive layer called septum.

The panels of cells 56 have dimensions suited to the compartments 54 which contain them so as to be immobilized therein.

According to one embodiment, each panel of cells 56 is a honeycomb panel made of metal or of composite material.

The elongated elements 32 or 36 of the de-icing system are incorporated in the partitions 50 and/or 52.

In the case of elongated elements 32 in the form of ducts, the latter are incorporated in the second partitions 52 or half-partitions 53 that are parallel in the longitudinal direction, as illustrated in FIGS. 3 to 10.

In the case of elongated elements 36 in the form of electrical resistors, the latter are incorporated in the first partitions 50 as illustrated in FIG. 11 or in the second partitions 52.

According to the invention, the acoustic caisson 42 comprises at least one single-piece substructure 58 which comprises partitions 50 or parts 50.1 of partitions arranged in transverse planes which are linked by at least a part of the lateral walls of the acoustic caisson 42. According to other embodiments, the partitions 50 or the parts 50.1 of partitions arranged in transverse planes are linked by partitions 52 or portions of partitions 52.1 or half-partitions 53 arranged in longitudinal planes.

A single-piece substructure should be understood to be a substructure in which the partitions 50, 52 or parts of partitions or half-partitions 53 are linked together and produced in a single piece.

According to the invention, the single-piece substructure 58 comprises the elongated elements 32, 36 of the de-icing system.

This design makes it possible to guarantee a better seal-tightness between the compartments 54 compared to the prior art solutions. Furthermore, it is possible to obtain seal-tight barriers in two directions (longitudinal and transverse).

According to a first embodiment, the single-piece substructure 58 is metallic and produced for example by machining, by casting, by forming. To ensure an optimal seal-tightness, the single-piece substructure 58 is not mechanically welded.

According to a second embodiment, the single-piece substructure 58 is made of composite material and produced for example by hot-forming or by molding.

Each partition 50, 52 or part of partition 50.1, 50.2 or half-partition 53 formed by the single-piece substructure 58 comprises a first edge positioned at the level of a first surface 60 oriented towards the axis of the nacelle 18 and a second edge positioned at the level of a second surface 62 opposite the first surface 60. Preferably, the second surface 62 is continuous, comprises no discontinuity in alignment and thus forms a joining surface.

To simplify the figures, the first and second surfaces 60, 62 are represented as planar. In reality, the first and second surfaces 60, 62 are curved and have at least one radius of curvature to match the curved profiles of the inner duct 26 and/or of the lip 22.

According to a first variant, the single-piece substructure 58 comprises at least one layer of the acoustically resistive substructure 44.

According to a first embodiment visible in FIG. 11, the acoustically resistive substructure 44 comprises a perforated plate or sheet 64. As an example, this plate or sheet is metallic. Preferably, this perforated plate or sheet 64 is incorporated in the single-piece substructure 58. Thus, according to this embodiment, the perforated plate or sheet 64, the first and second partitions 50, 52, the first parts 50.1, 52.1 of the first and second partitions 50, 52 and the half-partitions 53 linked to the acoustically resistive substructure 44 are produced in a single piece.

According to a second embodiment, the acoustically resistive substructure 44 comprises two superposed layers, namely a porous layer, such as a metal screen for example, and a structural layer which comprises wide openings blocked by the porous layer. Preferably, the structural layer is incorporated in the single-piece substructure 58.

According to other variants visible in FIGS. 3 to 10, the acoustically resistive substructure 44 and the single-piece substructure 58 are two distinct pieces. According to one embodiment, the acoustically resistive substructure 44 is bonded to the first surface 60 of the single-piece substructure 58. The fact that the first surface 60 is continuous simplifies the bonding of the acoustically resistive substructure 44 to the single-piece substructure 58.

According to a first variant visible in FIG. 11, the single-piece substructure 58 has a height (dimension in the radial direction) substantially equal to the height of the acoustic structure 42. According to this variant, the acoustic structure 42 comprises a cover 66 in the form of at least one non-perforated plate or sheet pressed against the second surface 62 of the single-piece substructure 58 to close the compartments 54 and ensure the function of the reflective layer 48.

According to other variants visible in FIGS. 3 to 10, the single-piece substructure 58 has a height less than the height of the acoustic structure 42. According to these variants, the acoustic structure 42 comprises a cover 68 which comprises the reflective layer 48 and the second parts 50.2, 52.2 of the first and second partitions 50, 52 linked to the reflective layer 48. Preferably, the cover 68 is single-piece.

FIGS. 3 to 6 show an embodiment of an acoustic caisson 42 configured for a pneumatic de-icing system.

According to this embodiment, the acoustic caisson 42 comprises a single-piece substructure 58, a cover 68, panels of cells 56 positioned in the compartments 54 formed by the single-piece substructure 58 and the cover 68 when they are assembled.

Preferably, the acoustic caisson 42 extends towards the rear of the nacelle from an adjoining zone 70 between the lip 20 and the front frame 30, as illustrated in FIG. 2.

As illustrated in FIG. 6, the single-piece substructure 58 comprises the acoustically resistive substructure 44, the half-partitions 53 and the first part 50.1 of the first partitions 50.

The single-piece substructure 58 has a rectangular form with a front edge 72, a rear edge 74, a right lateral edge 76 and a left lateral edge 78. The front and rear edges 72, 74 are arranged in transverse planes and the lateral edges 76 and 78 are arranged in longitudinal planes.

The first surface 60 of the single-piece substructure 58 comprises, at the front edge 72, a discontinuity in alignment 80 to house the walls of the front frame 30 and of the lip 20.

The single-piece substructure 58 also comprises, at the front edge 72, a strip of material 82 which extends from the right lateral edge 76 to the left lateral edge 78 and from the first surface 60 to the second surface 62. This strip of material 82 is passed through by the ducts 32 of the de-icing system. Between the ducts 32, the strip of material 82 comprises housings 84 in which the link elements 86 for linking the acoustic structure 42 to the lip 20 and to the front frame 30 are arranged.

The half-partitions 53 extend from the strip of material 82 to the rear edge 74. These half-partitions 53 are evenly spaced apart. One of them is positioned at the left lateral edge 78. Each half-partition 53 comprises a duct 32 of the de-icing system. In a transverse plane, these half-partitions 53 each have an approximately square section.

None is positioned at the right lateral edge 76. The right lateral edge 76 comprises a part of a second partition 52.1.

The rear edge 74 comprises a rear wall 88 which is arranged in a transverse plane and which has a height greater than the acoustic structure 42.

The first partitions 50 extend from the right lateral edge 76 to the left lateral edge 78.

The acoustically resistive substructure 44 incorporated in the single-piece substructure 58 takes the form of a plate that is perforated at the level of the compartments 54.

As illustrated in FIG. 4, the cover 68 comprises a bottom plate 90, lateral walls 92, 94, a rear wall 96, an inclined face 98 prolonged by a front wall 100 substantially parallel to the bottom plate 90.

The lateral walls 92, 94 and the rear wall 96 are substantially at right angles to the bottom plate 90.

The second parts 50.2 of the first partitions 50 are at right angles to the bottom plate 90 and extend from one lateral wall to the other. They are configured to be arranged in the extension of the first parts 50.1 of the first partitions 50 of the single-piece substructure 58.

The lateral walls 92, 94 are configured to be arranged in the extension respectively of the part of the second partition 52.1 positioned at the right lateral edge 76 and of the half-partition 53 positioned at the left lateral edge 78. Thus, the lateral wall 92 of the cover 66 and the part of the second partition 52.1 form a tight first lateral wall of the acoustic caisson 42. The lateral wall 94 of the cover and the half-partition 53 form the tight second lateral wall of the acoustic caisson 42.

When the cover 68 and the single-piece substructure 58 are linked, the rear wall 96 of the cover 68 is pressed against the rear wall 88 of the single-piece substructure 58.

The front wall 100 is configured to be pressed against the strip of material 82 of the single-piece substructure 58. This front wall 100 comprises cutouts 102 to free the housings 84.

According to one embodiment, the cover 68 and the single-piece substructure 58 are linked by bolts and/or screws. Thus, a first series of screws 104 links the front wall 100 of the cover 68 and the strip of material 82 of the single-piece substructure 58 and a second series of bolts 106 links the rear wall 96 of the cover 68 and the rear wall 88 of the single-piece substructure 58.

Finally, each lateral wall 92, 94 comprises a series of orifices 108 for linking two acoustic structures 42 together.

According to the embodiment visible in FIGS. 3 to 6, a first partitioning is obtained that is oriented longitudinally with longitudinal partitions only at the lateral edges 76 and 78 of each acoustic caisson and a second partitioning is obtained that is oriented transversely with transverse partitions 50.

Thus, volumes are obtained that are delimited by two adjacent transverse partitions 50 and the tight lateral walls of the acoustic caissons 42 or by a transverse partition 50 and the front or rear wall of the caissons and the tight lateral walls of the acoustic caissons 42.

In this case, for each caisson, each panel of cells 56 extends from one lateral wall to the other and comprises grooves to house the half-partitions 53.

According to this embodiment, a first partitioning is obtained with a tighter pitch in the longitudinal direction, suited to the strong pressure gradient in the longitudinal direction and a second partitioning is obtained with a greater pitch along the circumference of the nacelle, the pressure gradient in this direction being weaker.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An acoustic structure for an aircraft nacelle, comprising, radially outwardly from a central longitudinal axis of the nacelle,
    an acoustically resistive substructure,
    at least one layer of cells, and
    a reflective layer,
    the acoustic structure further comprising:
        elongated elements of a de-icing system,
        first partitions arranged in transverse planes,
        a plurality of acoustic caissons juxtaposed with one another on at least a part of a periphery of the nacelle,
            each acoustic caisson delimited by lateral walls arranged in longitudinal planes,
            each acoustic caisson comprising at least one single-piece substructure to divide up the layer of cells which comprises:
                at least one of the first partitions or first parts of the first partitions linked to the acoustically resistive substructure, the first partitions or first parts of the first partitions linked by at least a part of the lateral walls of the acoustic caisson,
                at least a part of the lateral walls of the acoustic caisson, and
                the elongated elements of the de-icing system.

2. The acoustic structure according to claim 1, wherein the single-piece substructure comprises, inserted between the lateral walls of the acoustic caisson, at least one of second partitions or parts of second partitions linked to the acoustically resistive layer and configured to link the at least one of first partitions or the first parts of the first partitions.

3. The acoustic structure according to claim 1, wherein the single-piece substructure comprises at least one layer of the acoustically resistive substructure.

4. The acoustic structure according to claim 3, wherein the acoustically resistive substructure comprises a perforated plate or sheet incorporated in the single-piece substructure.

5. The acoustic structure according to claim 3, wherein the acoustically resistive substructure comprises a porous layer and a structural layer which comprises wide openings blocked by the porous layer, said structural layer incorporated in the single-piece substructure.

6. The acoustic structure according to claim 1, wherein the single-piece substructure comprises a first continuous surface to which the acoustically resistive substructure is bonded.

7. The acoustic structure according to claim 1, wherein the single-piece substructure comprises a first surface oriented towards the axis of the nacelle and a second surface opposite the first surface, said second surface continuous and forming a joining surface.

8. The acoustic structure according to claim 7, wherein each acoustic caisson comprises a cover linked to the second surface of the single-piece substructure.

9. The acoustic structure according to claim 8, wherein the cover comprises the reflective layer and the second parts of the first partitions linked to the reflective layer.

10. The acoustic structure according to claim 9, wherein the cover is single-piece.

11. A nacelle comprising an acoustic structure, comprising, moving away from a central longitudinal axis of the nacelle,
    an acoustically resistive substructure,
    at least one layer of cells, and
    a reflective layer,
    the acoustic structure further comprising:
        elongated elements of a de-icing system,
        first partitions arranged in transverse planes,
        a plurality of acoustic caissons juxtaposed with one another on at least a part of a periphery of the nacelle,
            each acoustic caisson delimited by lateral walls arranged in longitudinal planes,
            each acoustic caisson comprising at least one single-piece substructure to divide up the layer of cells which comprises:
                at least one of the first partitions or first parts of the first partitions linked to the acoustically resistive substructure, the first partitions (50) or first parts of the first partitions linked by at least a part of the lateral walls of the acoustic caisson,
                at least a part of the lateral walls of the acoustic caisson, and
                the elongated elements of the de-icing system.

12. An aircraft comprising an acoustic structure for a nacelle of the aircraft, comprising, moving away from a longitudinal axis of the nacelle,
    an acoustically resistive substructure,
    at least one layer of cells,
    a reflective layer,
    the acoustic structure further comprising:
        elongated elements of a de-icing system,
        first partitions arranged in transverse planes,
        a plurality of acoustic caissons juxtaposed with one another on at least a part of a periphery of the nacelle,
            each acoustic caisson delimited by lateral walls arranged in longitudinal planes,
            each acoustic caisson comprising at least one single-piece substructure to divide up the layer of cells which comprises:
                at least one of the first partitions or first parts of the first partitions linked to the acoustically resistive substructure, the first partitions (50) or first parts of the first partitions linked by at least a part of the lateral walls of the acoustic caisson, at least a part of the lateral walls of the acoustic caisson, and the elongated elements of the de-icing system.

* * * * *